Figure 1:
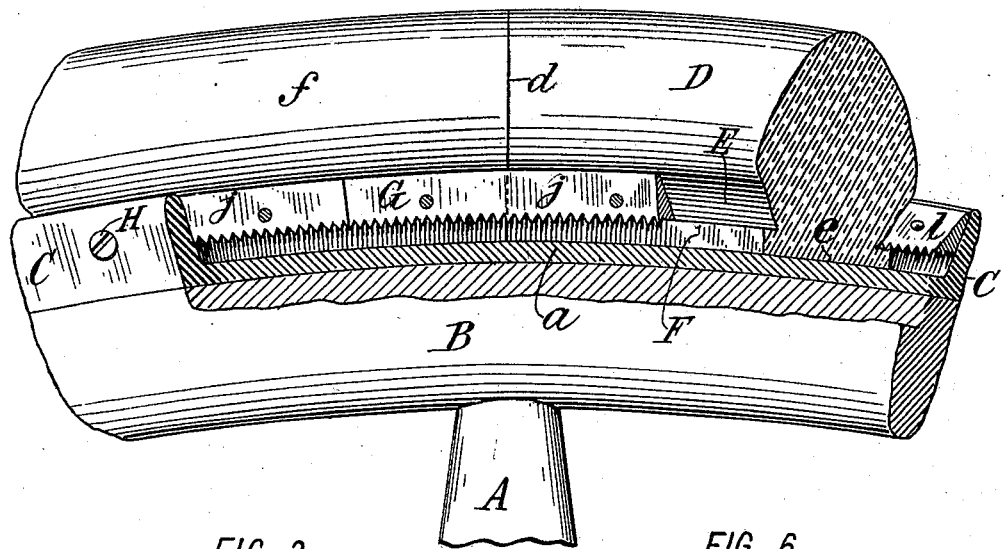

No. 685,450. Patented Oct. 29, 1901.
W. J. KENT.
VEHICLE WHEEL AND MEANS FOR ATTACHING RUBBER TIRES THERETO.
(Application filed Jan. 26, 1901.)
(No Model.)

WITNESSES:
Fred White
René Bruine

INVENTOR:
William J. Kent,
By Attorneys,
Arthur E. Fraser & Co.

THE NORRIS PETERS CO., PHOTO-LITHO., WASHINGTON, D. C.

UNITED STATES PATENT OFFICE.

WILLIAM J. KENT, OF BROOKLYN, NEW YORK.

VEHICLE-WHEEL AND MEANS FOR ATTACHING RUBBER TIRES THERETO.

SPECIFICATION forming part of Letters Patent No. 685,450, dated October 29, 1901.

Application filed January 26, 1901. Serial No. 44,824. (No model.)

*To all whom it may concern:*

Be it known that I, WILLIAM J. KENT, a citizen of the United States, residing in the borough of Brooklyn, in the county of Kings, city and State of New York, have invented certain new and useful Improvements in Vehicle-Wheels and Means for Attaching Rubber Tires Thereto, of which the following is a specification.

This invention relates to the tires of wheels, and especially to rubber tires for carriages and other vehicles, and aims to provide an improved tire and improved means for attaching a cushioned tire to a wheel.

It is common in using rubber tires to shrink a rim of channel-iron with parallel or diverging sides over the wooden felly of the wheel and fix the rubber tire in the channel of this rim by means of a number of wires traversing the tire longitudinally through holes molded in the latter near its base, these wires being brazed together at their ends, while the ends of the tire are separated, after which the ends of the tire are drawn together. In this construction escape of the tire is intended to be prevented by the tensile strength of the body of rubber between the wires, and creeping is intended to be avoided by the friction of the base of the tire against the bottom of the channel. In this construction the ends of the tire are drawn together after brazing the wires, the tire being originally cut to the length suitable for tightly fitting around the rim.

My present invention aims to avoid the expense and inconvenience of forming the tire with longitudinal holes for the wires, the necessity for introducing or using wires, and the weakening of the tire at the point of location of the wires; and it also aims to provide a solid tire imperforate in cross-section, improved external means for fastening the tire to the rim and for preventing it from creeping, and a construction in which the greatest elasticity shall be obtained.

In carrying out the preferred form of the present invention I provide a tire having a solid body, angular receding side faces near its base, and a wide flange inward of such faces for fitting loosely within the channel of a rim, and I provide removable clamps for engaging the flanges of the tire, said clamps adapted to be fastened on the inner faces of the flanges of the rim and having serrated lower sides for engaging the flange of the tire and inclined inner faces spaced apart from and of greater angularity than the adjacent inclined faces of the tire, and I provide means for drawing said clamps downwardly against the flanges of the tire. The diverging inclination between the sides of the tire and the adjacent faces of the clamps and the spacing apart of these members give expansion room for the tire, which permits great elasticity for the latter. The serrated faces of the clamps engage the outer faces of the flanges and prevent creeping of the tire, and the means for drawing the clamps downwardly against the flanges insure a tight seating of the tire within the channel-rim and avoid risk of its escape.

Figure 2:
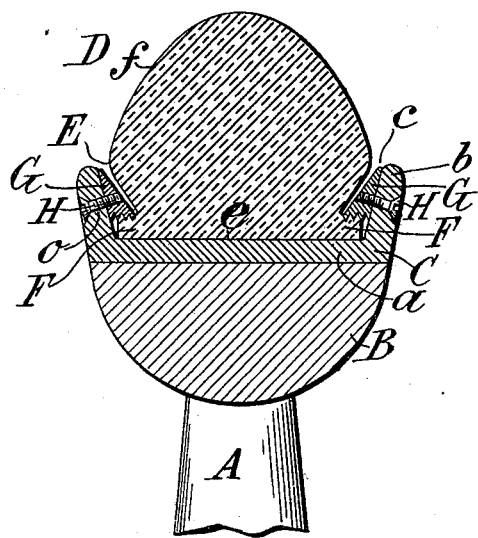
Figure 6:
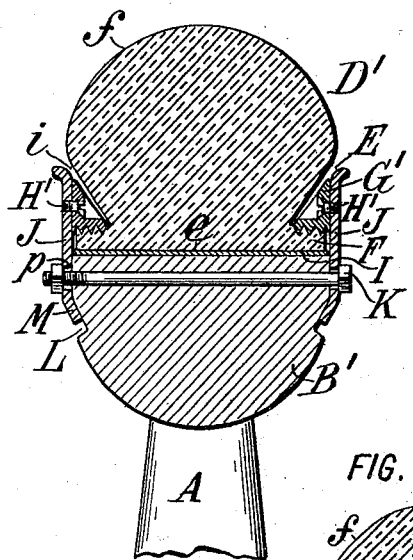
Figure 3:
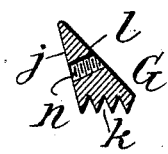
Figure 4:
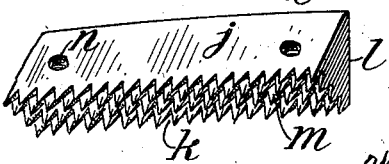
Figure 5:
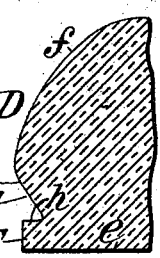

In the accompanying drawings, which illustrate certain adaptations of my invention, Figure 1 is a fragmentary side elevation of the felly, rim, and tire of a rubber-tired wheel, the parts being partially broken out to show more clearly the preferred form of my improvements. Fig. 2 is a fragmentary cross-section thereof. Fig. 3 is an enlarged cross-section of the preferred form of my improved clamp. Fig. 4 is a perspective view showing the outer and bottom faces thereof. Fig. 5 is a fragmentary cross-section of the tire alone, and Fig. 6 is a fragmentary cross-section showing a modification.

Referring to the drawings, let A indicate the spokes, B the felly, C the rim, and D the tire, of a rubber-tired wheel. These parts may be of any usual or suitable construction in their general characteristics. The channel-rim shown is the usual metal rim which is shrunk on the felly B and has a wide bottom $a$ and side flanges $b$, within which is the tire-receiving channel $c$. The flanges $b$ are customarily made either at right angles to the bottom $a$ or outwardly flaring relatively thereto, the latter construction being that shown. The tire D is a solid rubber strip or band cut to such length that when it is wrapped around the rim C its ends $d$ will meet. The tire has a base $e$ of approximately the same width as and seating firmly on the bottom $a$ of the rim and has, as heretofore, a groove E extending longitudinally of each side between its base $e$ and its tread $f$. Below the groove the tire has the usual longitudinally-extending lateral flanges F, and within the grooves are clamps G, overhanging the flanges F and fixed to the inner walls of the rims $b$ by screws H, as heretofore. As thus far described the parts may be of any usual or suitable construction, those shown being in their general characteristics of well-known form.

According to one feature of my invention I form the groove E as an angular groove and the flange F as rectilinear in cross-section, making the top wall $h$ of the flange approximately flat and parallel with the bottom wall $e$ of the tire and make the side wall $i$ of the groove oblique and preferably rectilinear in its outward extension from the flange to the point where it meets either abruptly or in a slight curve the arc-shaped tread of the tire.

According to another feature of improvement I form the clamps G approximately triangular in cross-section with outer walls $j$ for fitting against the inner walls of the flanges $b$ of the rim C, with bottom walls $k$ approximately parallel with the bottom wall $a$ of the rim C, and with outwardly-extending oblique inner walls $l$ for opposing the angular walls $i$ of the grooves E. The angularity of the inner walls $l$ of the clamps G is greater than that of the opposing walls of the tire D, and the cross-sectional width of the clamps is less than that of the groove at its deepest part, the clamps and grooves being so proportioned that when the clamps are home on the inner walls of the rim there will be a material and preferably outwardly-increasing space between the angular inner walls of the clamps and the angular outwardly-flaring walls of the grooves in the tire. This space extends from the top $h$ of the flange F of the tire outwardly and constitutes expansion room for the body of a tire from the base outwardly, thus affording abundant opportunity for expansion and contraction, and consequently giving room for utilizing the full elasticity of the tire in use.

According to another feature of improvement I make the under faces of the clamps parallel with the opposing face of the flange F of the tire and with the bottom face $a$ of the channel, and I preferably form the bottom face $k$ of the clamps with serrations or gripping provisions $m$ for engaging or gripping the tire to prevent creeping of the latter longitudinally around the channel, which provisions also prevent tendency of the tire to escape laterally from the channel.

According to another feature of improvement I dispose the screws H for fastening the clamps to the inner walls of the channel obliquely of the bottom wall of the latter, so that as these screws are driven home they will draw downwardly on the clamps, thus forcing the latter into intimate engagement with the flanges F, as best seen in Fig. 2. For this purpose the screw-threaded holes $n$ through the clamps are inclined relatively to the horizontal in the construction shown in Figs. 1, 2, and 3, and the corresponding holes $o$ through the rim are likewise inclined.

In use the tire will be wound around the rim before the clamps are placed therein and will be cut to the necessary length to make a suitable fit when the ends of the tire abut. The clamps will then be placed in the grooves in the tire, and the latter and the clamps will be replaced in the channel of the rim. The clamps will then be loosely connected to the rim by their screws H, after which the tire will be stretched around the rim until its ends abut and it is in the desired condition for use; whereupon the clamps adjacent to the abutting ends of the tire will be tightened until these ends are fixed in position. Then the remaining clamps will be tightened until the tire is firmly secured to the channel at all points throughout its length. The tire will then present a solid rubber body from its tread to its base, all portions of which body, except the base bearing on the bottom $a$ of the channel and the top surfaces of the flanges F, engaged by the clamps, will be free and unconfined and capable of any desirable movement incident to expansion or contraction during use. The serrated faces of the clamps will prevent creeping of the tire within the rim and resist lateral tendency of the flanges to withdraw from under the clamps, and the tire will be effectively secured to the wheel without in any manner impairing its strength or elasticity.

It will be seen that my invention provides means whereby rubber tires can be cheaply and durably constructed, readily and quickly applied or removed, and securely retained in position without impairing either their elasticity or strength, and it will be understood that the invention is not limited to the exact details of construction and use set forth as constituting its preferred form, since it can be employed according to such modifications as circumstances or the judgment of those skilled in the art may dictate without departing from the spirit of the invention.

One modification is shown in Fig. 6, in which the tire D' seats on a bearing-strip I, resting directly on the felly B' between separate rim-flanges J, which are clamped against the sides of the felly by a cross-bolt K. These rim-flanges have parallel inner walls against which the clamps G' are held by screws H', which are parallel with the base $e$ of the tire. The bottom faces of the clamps are constructed, as before described, for engaging the lateral flanges F of the tire, and the inner faces of the clamps are outwardly inclined at greater angles than and spaced apart from the adjacent inner angular faces $i$ of the tire. For drawing the clamps down against the flanges of the tire the felly has beveled portions L, into which fit the inclined inner edges M of the rim-plates J, so that as the bolts K are drawn home these inclined edges will ride down the beveled portions of the felly, thus drawing the rim-plates inwardly and forcing the clamps against the flanges of the tire. The large holes $p$ for the bolt K permit sufficient movement of the rim-flanges for this purpose. The screws H' are here shown as entering from the inside of the clamps.

What I claim is—

1. A wheel having a rim and flanges at each side thereof forming a channel, in combination with a yielding tire having a base within said channel, and a flange on each side therein, and a groove on each side outwardly of said flanges, and clamps within said grooves having serrated faces opposite and engaging the outer sides of said flanges.

2. A wheel having a metal rim and flanges at each side thereof forming a channel, in combination with a rubber tire having a base within said channel, a laterally-projecting flange on each side therein, and a longitudinally-extending groove having an outward-inclined wall on each side outwardly of said flanges, clamps of triangular cross-section within said grooves having outwardly-inclined inner faces opposite the inclined faces of said grooves, and having serrated faces engaging the outer faces of said flanges, and means fastening said clamps to the inner sides of said channel-flanges.

3. A wheel having a felly B and a channel-rim C, in combination with a rubber tire D having a base $e$ seating on said channel-rim, a flange F on each side therein, and a groove E on each side outwardly of said flange, of clamps G within said grooves out of contact with and spaced apart from the side walls of said tire, and having faces engaging the outer faces of the flanges of the latter, and inclined screws H fastening said clamps to the sides of said rim and drawing said clamps against said flanges.

In witness whereof I have hereunto signed my name in the presence of two subscribing witnesses.

WILLIAM J. KENT.

Witnesses:
GEORGE H. FRASER,
FRED WHITE.